United States Patent
Flanigan et al.

(10) Patent No.: US 8,481,622 B2
(45) Date of Patent: Jul. 9, 2013

(54) SOYBEAN BASED EPOXY RESIN AND METHODS OF MAKING AND USE

(75) Inventors: Virgil Flanigan, Rolla, MO (US);
Shubhen Kapila, Rolla, MO (US); K. Chandrashekhara, Rolla, MO (US);
Rachadaporn Seemamahannop, Rolla, MO (US); Arun Garg, Rolla, MO (US);
Surya Misra, Ballwin, MO (US)

(73) Assignee: The Curators of the University of Missouri, Columbia, MO (US)

( * ) Notice: Subject to any disclaimer, the term of this patent is extended or adjusted under 35 U.S.C. 154(b) by 72 days.

(21) Appl. No.: 11/849,278

(22) Filed: Sep. 1, 2007

(65) Prior Publication Data
US 2008/0058448 A1 Mar. 6, 2008

Related U.S. Application Data

(60) Provisional application No. 60/841,698, filed on Sep. 1, 2006.

(51) Int. Cl.
*C08K 5/15* (2006.01)

(52) U.S. Cl.
USPC .......................................... 524/114; 528/365

(58) Field of Classification Search
USPC ....................................................... 528/365
See application file for complete search history.

(56) References Cited

U.S. PATENT DOCUMENTS

| | | | | |
|---|---|---|---|---|
| 2,949,441 A | * | 8/1960 | Newey | 528/361 |
| 3,256,222 A | * | 6/1966 | Dalibor et al. | 528/87 |
| 3,816,479 A | * | 6/1974 | Kleemann et al. | 549/525 |
| 4,308,185 A | * | 12/1981 | Evans et al. | 523/423 |
| 4,559,092 A | * | 12/1985 | Oakley | 156/69 |
| 4,865,704 A | * | 9/1989 | Saatweber et al. | 204/503 |
| 5,176,865 A | | 1/1993 | Beall et al. | |
| 6,048,427 A | | 4/2000 | Gauchel et al. | |
| 6,797,753 B2 | * | 9/2004 | Benecke et al. | 524/114 |
| 2005/0250923 A1 | * | 11/2005 | Palmese et al. | 526/317.1 |

FOREIGN PATENT DOCUMENTS

| | | |
|---|---|---|
| DE | 0060505 A1 | 9/1982 |
| DE | 19822235 A1 | 11/1999 |
| GB | 789034 | 1/1958 |
| GB | 1182469 | 2/1970 |
| GB | 2080315 A * | 3/1982 |

OTHER PUBLICATIONS

Javni et al. (140/ANTEC '97, p. 791, 1997).*
Zhu et al. (Composites: Part A 35 (2004) 95-101).*
PCT/US07/077472, International Search Report and Written Opinion, mailed Jan. 15, 2008.

* cited by examiner

*Primary Examiner* — Shane Fang
(74) *Attorney, Agent, or Firm* — Dan Cleveland, Jr.; Lathrop & Gage, LLP

(57) ABSTRACT

An improved soybean oil ester based epoxy resin and method of making the same is disclosed. A transesterification step is employed to liberate glycerol and to form new fatty acid esters with additional double bonds. The resulting fatty acid esters containing one or more double bonds are epoxidized by reacting with epoxidation reagent. The epoxidized esters serve as monomers in an epoxy resin system, which may be used to manufacture composite materials with improved mechanical properties as compared to materials obtained from epoxidized triglycerides. The soybean based epoxy resin may be used as low-cost and biocompatible coating materials for food and beverage cans.

4 Claims, 5 Drawing Sheets

SOYBEAN BASED EPOXY RESIN AND METHODS OF MAKING AND USE

This application claims priority to U.S. provisional patent application Ser. No. 60/841,698 filed on Sep. 1, 2006.

BACKGROUND

1. Field of the Invention

The present disclosure relates to a method for manufacturing new resin based materials. More particularly, the disclosure pertains to use of soybean oil to prepare epoxy resin suitable for making pultrudable composite materials and for coating food containers.

2. Description of the Related Art

Epoxy resin is widely used in manufacturing and construction sectors. The production value of epoxy resin for the United States, Western Europe and Japan in 1999 was estimated to be over $2 billion. It is also estimated that the growth of epoxy resin consumption in the United States and Western Europe for years 1999-2004 averaged about 3.5%-4%. Because conventional epoxy resins are solely based upon petroleum derived products, increasing use of epoxy resin means greater demand for petroleum products. In an effort to reduce dependence on fossil fuels, there are growing interests for a dual-resin system that may supplement petroleum-based epoxy resins with epoxy resins made from renewable sources, such as vegetable oils, while at the same time enhance certain properties of the materials.

One application of epoxy resin is in the manufacturing of composite materials. Pultrusion is the fastest and most cost-effective composite manufacturing processes, and is well suited for high volume production for structural applications. Existing soybean based epoxy resins suffer from lack of certain desirable properties, such as pultrudability or mechanical toughness, to name a few. There is therefore a need to develop an improved pultrudable bio-based resin that is suitable for manufacturing composite materials.

Every year, more than 100 billion cans are produced worldwide for packaging perishable foods and beverages. Food and beverage cans are usually made of materials containing a metal substrate and an organic lacquer. The interior coating of the cans helps prevent the metal from reacting with the contents of the can. For example, the coating may prevent corrosion of the metal by acidic beverages. Petroleum derived products are the major source of can-coating materials. Using plant derived renewable raw materials to develop these coatings may reduce the burden on diminishing petroleum resources.

Beverage and food cans are usually two-piece cans produced by the drawn and wall ironing process, and typically require highly flexible coatings. However, traditional curing without epoxidation produces densely cross-linked films with high chemical resistance but poor flexibility. There is a need for a coating material that is more flexible than conventional coatings.

SUMMARY

A novel soy-based epoxy resin, Epoxidized Allyl Soyate ("EAS") is disclosed. The resin may be prepared through a two-step chemical process involving transesterification and epoxidation. Mechanical tests show that the soy epoxy resin based materials prepared according to the processed described herein possess properties comparable to those obtained with the commercially available Epon Shell resin.

The predominant components of soybean oil are triglycerides, i.e., fatty acid esters of glycerol. Soybean oil may be transformed into monomeric materials through a two-step reaction. First, the process involves a transesterification reaction between triglycerides and an alcohol in the presence of an acid or a base as catalyst. The transesterification results in liberation of glycerol and formation of new esters between the fatty acid and the alcohol. Second, the new esters thus formed may be epoxidized with a chemical epoxidation reagent, such as m-chloroperoxybenzoic acid in a glycerol solvent or through catalytic epoxidation in the presence of a suitable catalyst.

Epoxidized esters obtained in the two-step process described above may serve as monomers in an epoxy resin system and may yield materials with better mechanical properties than the materials obtained from epoxidized triglycerides. This improved property may be partly explained by the enhanced inter-molecular cross-linking in the epoxidized esters resin system. By contrast, an epoxidized triglyceride system has a tendency to undergo intra-molecular crosslinking because inter-molecular crosslinking may be sterically hindered.

The soybean based epoxy resins may be cured with appropriate curing agents. EAS exhibits improved reactivity and higher cross-linking density, as well as enhanced curing characteristics and glass transition, when compared to commercially available epoxidized soybean oil.

The EAS disclosed herein has low viscosity which helps achieve greater wettability and better cure. The improved properties of the resin may help increase the line speed during the pultrusion process and may also decrease the required pull force. The composite manufactured with the resin of the present disclosure has high impact properties as compared to conventional epoxy based composites. In addition, the flexible nature of the EAS also makes it ideal for various pultrusion processes, such as those disclosed in U.S. Pat. Nos. 6,048,427, 5,176,865, which are hereby incorporated by reference.

The EAS resin disclosed herein is also ideal for coatings various surfaces, including those made of metal, plastic or glass and others. The flexible nature of the EAS renders it most suitable for coating beverage and food containers. The low viscosity of the EAS affords operational simplicity when various coating techniques, such as spray-on, are used. Moreover, because the soybean oil based coatings are based on renewable bio-materials, and not petroleum, the development and use of soybean based EAS may have a significant impact on environmental conservation.

DETAILED DESCRIPTION

Figure 1:
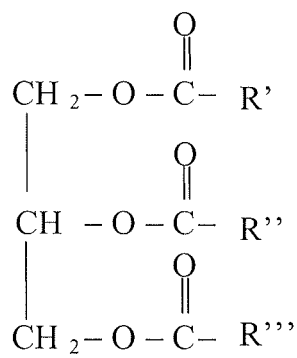
FIG. 1 shows a general chemical structure of vegetable oil.

The predominant components of natural soybean oil are triglycerides, which are esters formed by fatty acids and glycerol (FIG. 1). Although the instant application uses soybean oil for purpose of illustrating the invention, the methods and the compositions taught in this disclosure are not limited to application using soybean oil. It is to be understood that other triglyceride-based oil may be used as starting materials to prepare the resin according to the methods taught by the instant disclosure. Examples of such oil may include but are not limited to peanut oil, canola oil, corn oil, coconut oil, olive oil, and animal or fish oil, among others. The fatty acid moiety of these oils may include saturated fatty acids, unsaturated fatty acids and combination thereof.

The major fatty acids found in natural soybean oil triglycerides include palmitic, stearic, oleic, linoleic and linolenic acids. Of these fatty acids, oleic, linoleic and linoleic acids contain carbon—carbon double bonds which may be epoxidized to form reactive epoxy groups. As shown in FIG. 1, fatty acids and glycerol from soybean oil are such that R', R", R'" may be one of any component derived from the following five fatty acids (with —COOH group substitution):

Palmitic fatty acid (C16:0): $CH_3$—$(CH_2)_{14}$—COOH
Stearic fatty acid (C 18:0): $CH_3$—$(CH_2)_{16}$—COOH
Oleic fatty acid (C18:1): $CH_3$—$(CH_2)_7$—CH=CH—$(CH_2)_7$—COOH
Linoleic fatty acid (C18:2): $CH_3$—$(CH_2)_4$—CH=CH—$CH_2$—CH=CH—$(CH_2)_7$—COOH
Linolenic fatty acid (C18:3): $CH_3$—$(CH_2)_4$—(CH=CH—$CH_2)_2$—CH=CH—$(CH_2)_4$—COOH Epoxidized soybean oil may be a mixture of epoxidized triglycerides. The average molecular weight of highly epoxidized soybean oil is approximately 920. Epoxidized oil contains approximately four epoxy (oxiran) groups per molecule. Saturated fatty acids, namely palmitic and stearic acids, contain no double bonds which are the sites of epoxidization. These fatty acids yield long hydrocarbon chains and generally do not interact with the hardeners in a polymer network. As a result, epoxidized natural soybean oil may yield very soft materials when reacted with the hardeners.

To obtain materials with better mechanical properties, a transesterification reaction of soybean oil with allyl alcohol may be carried out to replace the alcohol moiety of the fatty acid esters with more desirable alcohols. Alcohols containing one or more double bonds such as those represented by formula I may be used to react with triglycerides to generate a form of soybean oil esters containing at least one double bond.

I wherein $R_1$ is an alkene containing 2-20 carbon atoms.

In a preferred embodiment, ally alcohol, which contains one terminal double bond, is used to react with soybean oil. In addition, as shown in FIG. 1, some fatty acids also contain one or more double bonds. The double bonds from both the alcohol and the fatty acid moieties may be epoxidized to certain degree, and they may also form cross links through reactions initiated by free radicals. Preferably, all double bonds from both the alcohol and the fatty acid moieties are epoxidized. Epoxidized soy oil allyl esters may be obtained through epoxidation of soybean oil followed by transesterification or transesterification of soybean oil followed by epoxidation of the esters, the latter of which is preferred.

To facilitate transesterification, excess allyl alcohol may be used to react with triglyceride. The transesterification may be catalyzed by an acid or a base. For purpose of this disclosure, the preferred catalyst is a base, such as potassium hydroxide or sodium hydroxide. The degree of transesterification may be monitored using analytical tools such as thin layer chromatography (TLC), or Gas Chromatography Mass Spectrometer (GC-MS).

Fatty acid allyl esters contain at least one double bond which may react with epoxidization agents. For instance, peroxyacids, which are carboxylic acids having an extra oxygen atom in the carboxylic group, may convert the double bonds to epoxides. A common peroxyacid used for such epoxidation is m-chloroperoxybenzoic acid (MCPBA).

The epoxidation process disclosed herein may be scaled up or down as desired according to production needs. Because an epoxidation reaction is generally an exothermic reaction, the reaction may proceed more efficiently when the excess heat is timely removed. Thus, the epoxidation reaction is preferably carried out in the presence of a cooling system, such as an ice bath. In addition, the epoxidation reaction is preferably carried on under constant stirring so that the generated heat may be quickly dissipated. The reaction temperature is preferably maintained at around or below 30° C. during the course of the epoxidation.

To maximize heat flow and contact between the reactants, the MCPBA may be dissolved in a solvent before mixing with the fatty acid esters. For instance, the reaction of MCPBA with soybean oil allyl ester may be conducted in chlorinated solvents such as dichloromethane, or other organic solvents in biphasic or emulsion systems. The preferred solvent for the epoxidizing reagent is glycerol, which is generally non-toxic and environmental friendly.

Figure 2:
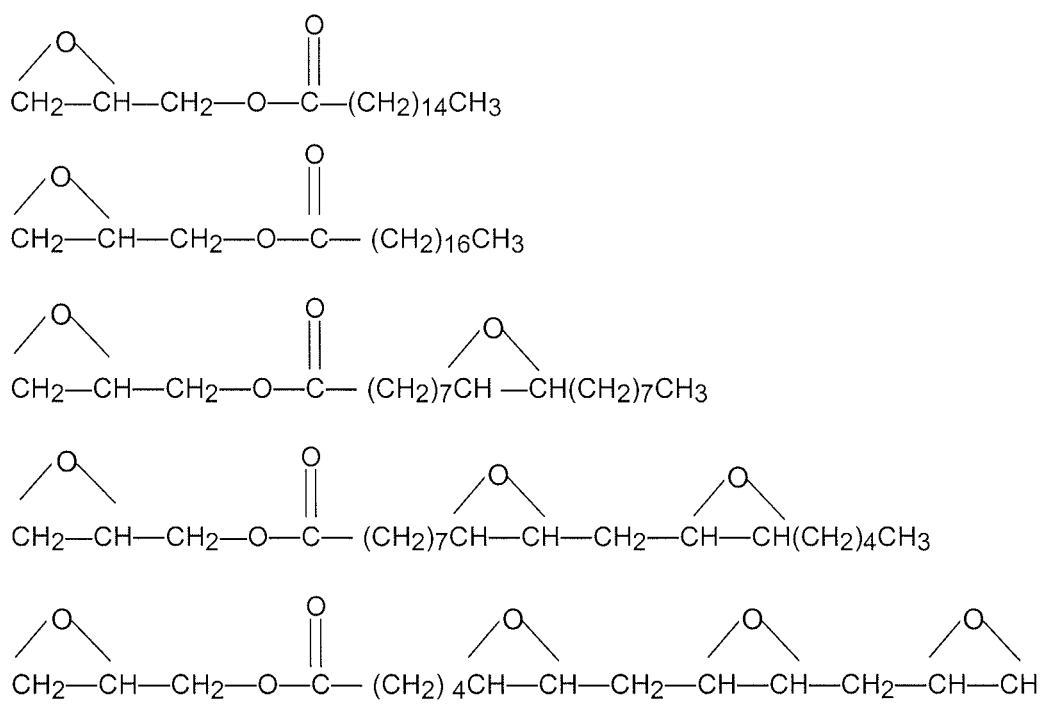
FIG. 2 shows a general structure of epoxidized fatty acid allyl esters.

The epoxidation reaction may be allowed to proceed until all the allyl esters have been epoxidized. When epoxidation is complete, another solvent may be added to the mixture to dissolve the epoxidized fatty acid esters. Although many solvents may be used, hexane is the preferred solvent for the epoxidized fatty acid esters. Because some components in the reaction mixture are insoluble in hexane, addition of hexane to the reaction mixture may cause the formation of a suspension with both liquid and solid phases. The soluble and insoluble contents of the suspension may be separated through sedimentation, or filtration. For instance, the hexane layer containing epoxidized allyl esters may be passed through a glass fiber filter and then centrifuged at 3500 rpm. Glycerol and residual allyl alcohol separate from the hexane layer. Hexane may be removed from the epoxidized esters through distillation or evaporation under a gas stream. A titration test may be conducted to evaluate the degree of epoxidation for the epoxy resin thus obtained. The general structures of the fully epoxidized allyl esters are shown in FIG. 2.

Figure 3:
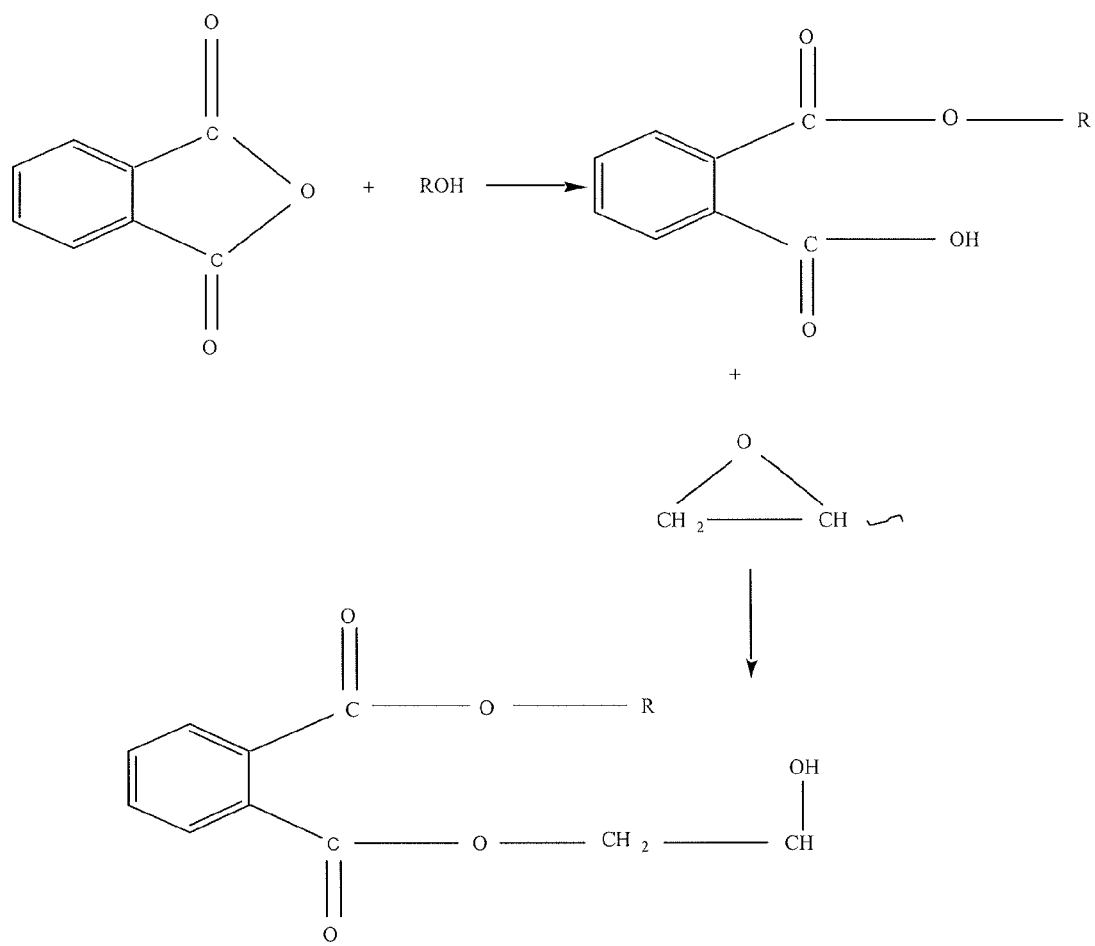
FIG. 3 shows a curing reaction between soybean based resin and Curing agent Phthalic Anhydride

The resultant soybean based epoxy resin may be cured using a curing agent, such as phthalic anhydrides (PA), including PA and its derivatives with a chemical formula of $C_8H_4O_3$, 3-methyl tetrahydro phthalic anhydride ($C_9H_6O_3$), 3-methyl hexahydro phthalic ahydride ($C_9H_8O_3$) or mixture there off. In addition di-anhydrides such as benzophenone-3, 3',4,4'-tetracarboxylic dianhydride ($C_{17}H_6O_7$), 1,2,4,5-benzenetetracarboxylic dianhydride ($C_{10}H_2O_6$) may be used for enhancing the rigidity of the materials. These anhydrides have previously been used for curing other epoxy resins. The reactions involved in the curing process with epoxidized allyl esters are depicted in FIG. 3. The curing characteristics and glass transition of these resins may be investigated using Differential Scanning Calorimeter (DSC). The soybean based epoxy allyl resin exhibits improved reactivity and higher cross-linking density compared to commercially available epoxidized soybean oil (Table 1).

TABLE 1

| Kinetic Parameters using Borchardt and Daniels Method of EAS | |
|---|---|
| Reaction Order (n) | 2.06 |
| Activation Energy (KJ/mol) | 114.3 |
| Pre-Exp factor ($K_0$) (Minute inverse) | 12.72 |
| Heat of reaction (Delta H) | 164.3 |

The presently disclosed soybean based epoxy resin, or Epoxidized Allyl Soyate ("EAS"), may be used for coating the interior of cans to be used for packaging food or beverages. For coating purpose, the cured resin maybe emulsified according to different coating requirements. Because the soybean based epoxy resin disclosed herein is more flexible than conventional coating materials, it provides a better material for coating the two-piece cans typically used in the food and beverage packaging industry.

In addition to reducing the brittle nature of conventional coatings, the soybean based epoxy resin may also have an advantage of being environmentally friendly. Therefore, in addition to helping prevent undesirable reaction between the food or beverage content and the metal, the disclosed soybean based coating are relatively harmless to the consumer and the environment. Interior coating using the disclosed materials may be applied with a solid content of about 20-33%.

Experiments may be designed to test if an individual coating affects the flavor of the food or beverage contained inside a can. In blind organoleptic tests with beer aged in container coated with different resins, the disclosed EAS coatings performed well when compared to conventional resins. The presently disclosed coating materials appear not to impart off flavor to the test beer (See Example 4 for details).

Figure 4:
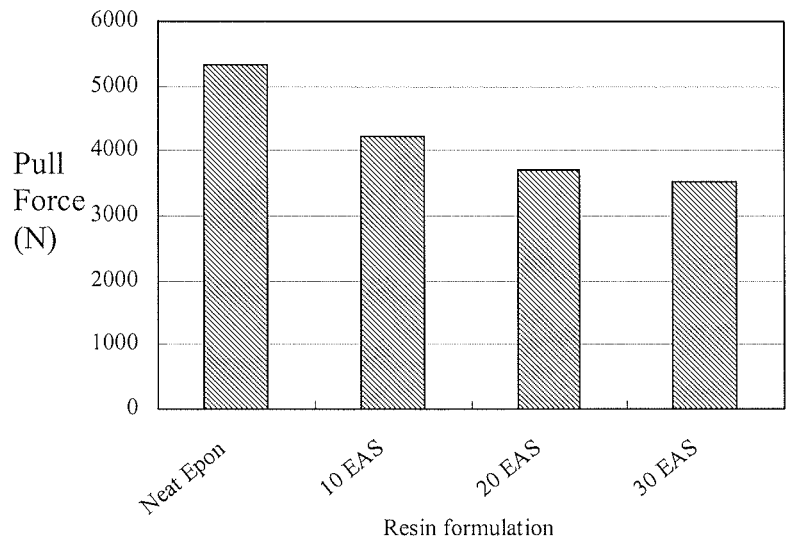
FIG. 4 shows the pulling force of pultrusion with various resin formulations.
Figure 5:
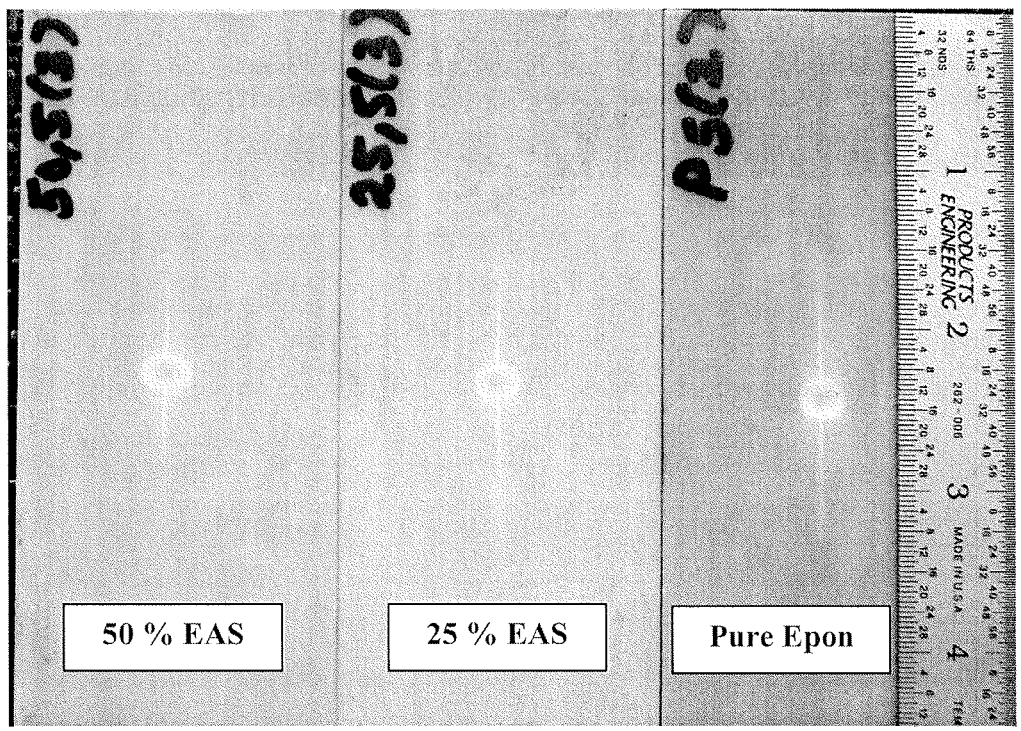
FIG. 5 shows front surfaces of pultruded composite samples impacted at 5 Joules to confirm that soy-based pultruded composites have improved impact resistance.

In another embodiment, the EAS may be used to manufacture structural materials using the pultrusion process. The soybean based pultrudable resin may have relatively low viscosity and consequently increased wettability (Table 2.). These properties of the resin may help increase the line speed and may lead to decreased pull force during the pultrusion process (FIG. 4). FIG. 4 shows that the pull force in pultrusion process is significantly reduced for EAS composite compared to Shell Epon based composite. As a result, the cost for the pultrusion process may be reduced and the productivity may be enhanced. The composite manufactured using EAS also has high impact properties as compared to conventional epoxy based composites (FIG. 5). Together, these results demonstrate that the EAS may be a more suitable resin for the pultrusion process as compared to conventional resins.

TABLE 2

| Viscosity in centipoise of EAS | |
|---|---|
| Viscosity | 49.302 ($mm^2/s^2$) |

The following examples are provided for purposes of illustration only and are not intended to be limiting. The chemicals and other ingredients are presented as typical components or reactants, and various modification may be derived in view of the foregoing disclosure within the scope of the invention.

EXAMPLE 1

Transesterification of Triglycerides

Figure 6:
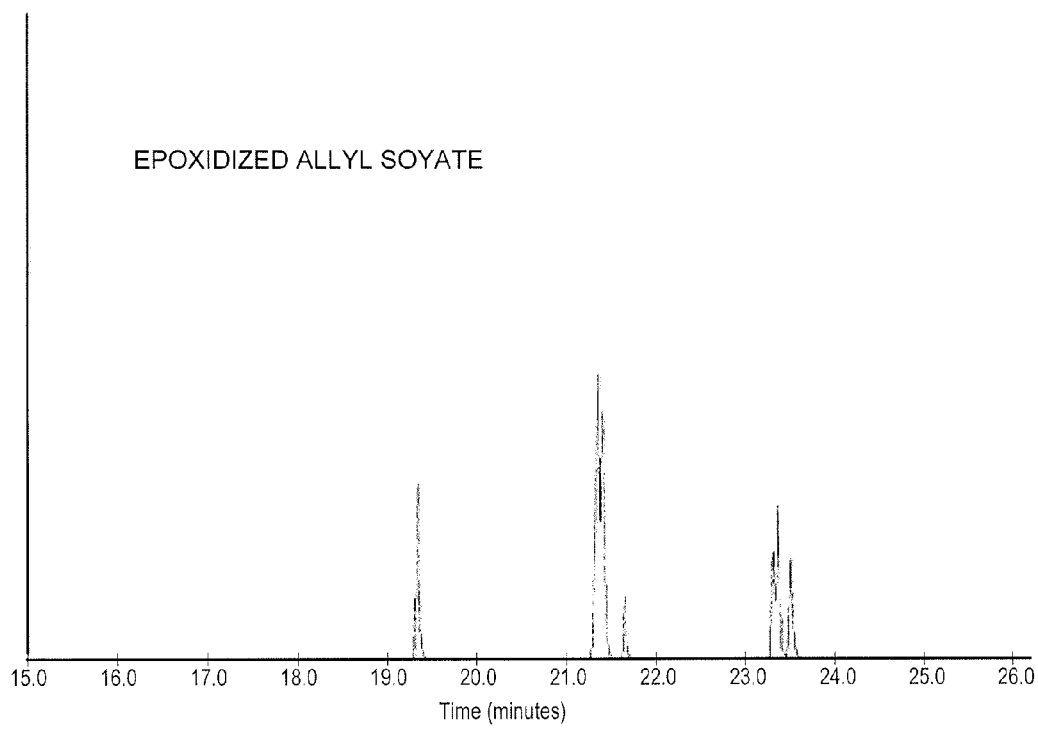
FIG. 6. shows gas chromatography analysis of transesterification and epoxidation of soy resin.

Transesterification of 1 mole of triglyceride was carried out with approximately 6 moles of allyl alcohol in presence of a base (potassium hydroxide—KOH) as a catalyst. The concentration of the base was 0.9% (w/w). To produce one liter of allyl esters, one liter of soybean oil was reacted with 348 g of allyl alcohol in the presence of 9.2 g of KOH, which was crushed and dissolved in the allyl alcohol. Soybean oil was heated to 90° C. in a three-neck flask. Allyl alcohol with KOH was then poured into the flask. A water cooled condenser was attached to the central neck of the flask, while a thermometer was inserted through one of the side necks. The third neck was used for introducing the reactants into the flask. The temperature of the reactant mixture was maintained at 90° C. until transesterification was complete. The transesterification time was approximately 2.5 hours under the condition specified above. During the reaction period, the degree of transesterification was monitored with thin layer chromatography (TLC). After termination of the reaction, the final products were analyzed with a Gas Chromatography Mass Spectrometer (GC-MS) analysis to verify the degree of transesterification (FIG. 6).

EXAMPLE 2

Epoxidation of Triglycerides and other Fatty Acid Esters

This example demonstrates the epoxidation procedure in a small laboratory scale. One liter of fatty acid allyl esters obtained in Example 1 was used to obtain one liter of soy based epoxy resin. Glycerol was used as a solvent and m-chloroperoxybenzoic acid (MCPBA) was used as a reagent. The ratio of esters:MCPBA:glycerol was 1:2:4. A round flask was placed in an ice bath. Glycerol and MCPBA were poured into the flask and mixed by an eccentric mixer until they formed a semi-paste. Small quantities of soy fatty acid ester solution were then added into the flask while eccentric mixing was continued. The process was continued until all the soy ester was uniformly mixed in the semi-paste.

Hexane was added to the flask to dissolve the epoxy esters. A suspension containing solid and liquid mixture was formed in the flask because not all components in the flask were soluble in hexane. The suspension was vacuum filtered to separate the solid parts from the liquid parts. The solid part contained primarily surplus MCPBA unused in the reaction while the liquid part contained primarily hexane, epoxy esters and glycerol. The liquid part was poured into a conical flask and allowed to separate into two layers. The bottom layer was removed which was mostly glycerol. The top layer contained hexane and epoxy esters and was recovered. Hexane was separated from the epoxy esters using a rotary evaporator. A titration test was conducted to evaluate the degree of epoxidation for the epoxy resin thus obtained (Table 3).

TABLE 3

| Epoxy Number and Degree of Epoxidation of Soy Resin | |
|---|---|
| Epoxy number | 5.676 |
| Degree of Epoxidation | 92.14% |

EXAMPLE 3

Curing of Soybean Based Resin with Phthalic Anhydride

Figure 7:
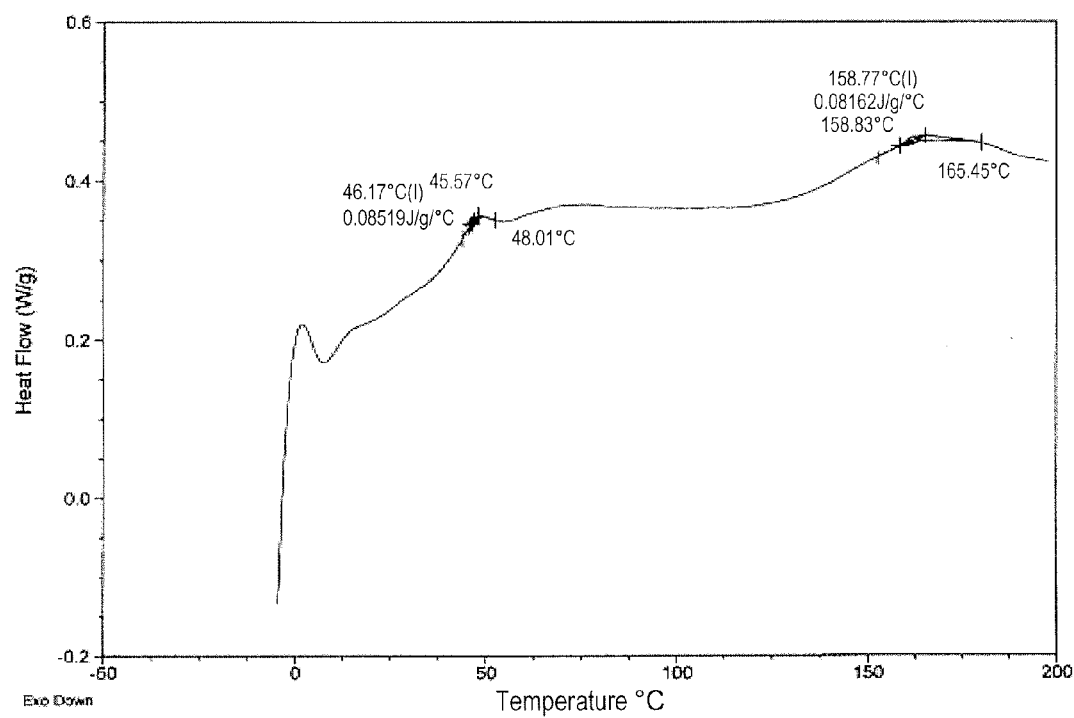
FIG. 7 shows differential scanning calorimetry (DSC) analysis of heat flow of Soy Resin.

The epoxy soybean based resin obtained in Example 2 were mixed with phthalic anhydride (PA). The mixture was applied to metallic surfaces and heat cured at temperatures ranging between 185-200° C. for 2-4 minutes. The curing characteristics and glass transition of these resins were determined using Differential Scanning Calorimeter (DSC) (FIG. 7).

EXAMPLE 4

Effects of Resin Coating on Beverage Flavor

A set of three aluminum coupons (7.5 cm×2.5 cm) were cut from uncoated and uncapped aluminum cans provided by Anheuser-Busch Inc., St Louis. A ⅛-inch hole was drilled at one end of the coupons and a short piece of 18 gauge wire was attached to the coupons through the hole. The coupons were marked in code to designate each resin. The marked coupons were carefully cleaned and dried before being dipped in three beakers each containing different resins. Approximately 4 cm length of the coupons was coated with the different resins. These resin-coated coupons were then cured at 300° F. for 30 minutes in an oven. The cured coupons were allowed to cool to room temperature before being sealed in separate envelops.

The three coupons were placed separately in three test containers filled with the same beer. A fourth container filled with the same beer was used as control without any coupon. Each container was labeled with numbers based on the different coatings. The relationship between the numbers and the coatings was known to the scientists, but unknown to the test subjects. The containers were then sealed, and aged at 25° C. for 15 days.

A panel of experts were recruited and subjected to a blind organoleptic test. The panel rated the beer from each container with or without (data not shown) the coupons based on three categories: taste, aroma, and other qualities (Table 4).

TABLE 4

| Blind Organoleptic Test Results | | | |
|---|---|---|---|
| Container | Designation | Coating | Remarks |
| 1 | 50% EAS | 50% EAS and 50% Base Epoxy | No off notes |
| 2 | 75% EAS | 75% EAS and 25% Base Epoxy | No off notes |
| 3 | 100% EAS | 100% EAS and 0% Base Epoxy | No off notes |

What is claimed is:

1. A method for coating a can with a coating composition made from triglyceride-based oil, comprising:
   a) a transesterification step wherein an excess amount of an unsaturated alcohol is mixed with a triglyceride in a reaction to form a new ester, said new ester having a fatty acid moiety and an unsaturated alcohol moiety, wherein said fatty acid moiety has at least one unsaturated fatty acid, and said unsaturated alcohol has the formula of $R_1$—OH, $R_1$ being an alkene containing 2-20 carbon atoms,
   b) an epoxidation step to convert at least one unsaturated double bond of the alcohol moiety and at least one unsaturated double bond of the fatty acid moiety into an epoxide, said epoxidation step being carried out at or below about 30° C.,
   c) a coating step that entails coating an interior surface of a can with a mixture that includes the foregoing material; and
   d) curing the mixture of the new ester and the epoxide by the action of a curing agent consisting of an anhydride to form a coating composition.

2. The method of claim 1, wherein the triglyceride-based oil is selected from the group consisting of soybean oil, peanut oil, canola oil, corn oil, coconut oil, olive oil, animal oil and fish oil.

3. The method of claim 1, wherein the triglyceride-based oil is soybean oil.

4. The method of claim 1, wherein the anhydride is phthalic anhydride.

* * * * *